United States Patent [19]

Jackson et al.

[11] Patent Number: 5,345,230
[45] Date of Patent: Sep. 6, 1994

[54] METHOD AND APPARATUS FOR OPTICAL TRANSCEIVER TESTING

[75] Inventors: Charles L. Jackson; Douglas A. Ochsner, both of Newton, Iowa

[73] Assignee: Dr. Johannes Heidenhain GmbH, Traunreut, Fed. Rep. of Germany

[21] Appl. No.: 867,414

[22] Filed: Apr. 13, 1992

[51] Int. Cl.$^5$ .............................................. H04Q 1/20
[52] U.S. Cl. .............................. 340/825.16; 324/527; 359/110; 455/67.4
[58] Field of Search ............. 340/825.16, 825.3, 825.5; 324/527, 537, 606; 359/110, 153, 161; 455/126, 115, 67.4

[56] References Cited

U.S. PATENT DOCUMENTS

| | | |
|---|---|---|
| 4,119,948 | 10/1978 | Ward et al. . |
| 4,137,499 | 1/1979 | Caudel ................................. 455/115 |
| 4,306,219 | 12/1981 | Main et al. . |
| 4,321,707 | 3/1982 | Beasley et al. ...................... 359/110 |
| 4,361,904 | 11/1982 | Matsumura ........................... 455/67 |
| 4,366,481 | 12/1982 | Main et al. . |
| 4,369,442 | 1/1983 | Werth et al. . |
| 4,561,091 | 12/1985 | Scholl et al. ......................... 370/85 |
| 4,689,757 | 8/1987 | Downing et al. . |
| 4,727,315 | 2/1988 | Jones ..................................... 324/110 |
| 4,845,484 | 7/1989 | Ellsberg . |
| 5,150,111 | 9/1992 | Fujieda et al. ..................... 340/825.3 |

OTHER PUBLICATIONS

"A DDCMP based Communications Protocol for the Vending Industry Data Transfer Standard," International Edition, Version 2, Feb. 1, 1992, pp. 5.i through 5.38 from a manual entitled *The Vending Industry Data Standard* produced for distribution to the members of the National Automatic Merchandising Association.
"Low Speed Optical Comms Link for the Vending Industry Data Transfer Standard," American Edition, Appendix A Draft 1, Jun. 12, 1990, pp. 5.Ai through 5.A8 from a manual entitled *The Vending Industry Data Standard* produced for distribution to the members of the National Automatic Merchandising Association.
Compute .A. Count Product Bulletin, from Rammell, Inc. of Idaho Falls, Id., 7 pages (undated).
Wick, J., "A Question and Answer Guide to Electronic Audit Systems," 1992. The Greenwick Company Inc. of Parkesburg, Pa., 20 pages plus an Audit Product Comparison Checklist (2 pages).

*Primary Examiner*—Donald J. Yusko
*Assistant Examiner*—Edward Merz
*Attorney, Agent, or Firm*—Willian Brinks Hofer Gilson & Lione

[57] ABSTRACT

A method and apparatus are disclosed for providing a self-test feature for an apparatus utilizing an optical communication link, such as commercial laundry appliances having a data acquisition system for storing information on appliance usage for subsequent transmission to a portable data unit. A signal having at least one known characteristic is applied to the transmitting portion of an optical transceiver, and at least a portion of the resulting transmitted optical energy is coupled to the optical detector of the receiving section of the same transceiver. The characteristics of the resulting output of the receiver elements of the transceiver corresponding to the coupled signal are compared to the corresponding characteristic of the known input signal. Correspondence of these characteristics will confirm valid operation of the transmitting elements and the receiving elements, and thus verify operation of the optical transceiver.

20 Claims, 3 Drawing Sheets

XCEIVER OK

METHOD AND APPARATUS FOR OPTICAL TRANSCEIVER TESTING

BACKGROUND OF THE INVENTION

1. Field of the Invention

This invention relates to a method and apparatus for testing an optical transceiver. In particular, method and apparatus are disclosed for providing a self-test feature for an apparatus utilizing an infrared communication link, such as commercial laundry appliances having data acquisition systems for storing information on appliance usage for subsequent transmission to a portable data unit.

2. Description of the Prior Art

Wireless communication utilizing optical signals is used in a variety of applications today. For example, infrared communication links may be provided between data accumulation devices and portable data units. In the commercial laundry field, coin operated laundry appliances are now provided with systems for accumulating information regarding operation of the appliance for subsequent retrieval by portable data units, such as handheld computers with cooperating optical transceivers. Use of wireless optical communication avoids problems inherent in any physical electrical connection (such as plug access and contamination) or radio frequency communication (such as interference and government regulation). Examples of such systems are provided by e.g. U.S. Pat. Nos. 4,306,219 (Main et al.); 4,369,442 (Werth et al.); and 4,845,484 (Ellsberg).

It is desirable to provide the optical communication system utilized in these systems with two-way communication capability, whereby the appliance may both transmit information to a portable collection unit and receive data or programming from a portable data unit. The appliance is therefore provided with both means for generating and transmitting optical signals, and means for receiving optical signals transmitted by an external device. Both an optical emitter and an optical detector are provided. Appropriate transmitting circuitry is provided for receiving signals for transmission and energizing the emitter to generate corresponding coded optical signals, and receiving circuitry is provided for discriminating detected optical signals into output electrical signals for further processing by the appliance. As discussed in the Ellsberg '484 patent, the optical emitters and detectors have preferably been arranged so that the radiation transmitted by the optical emitter, typically in a conical beam, will not be read by the optical detector of that transceiver.

A failure in any of the foregoing elements may result in an overall failure of the desired communication. For example, a fault in either the transmitting circuitry or the optical emitter may prevent the appliance from transmitting data to a portable data unit, while a fault in either the detector or the receiving circuitry may result in a failure of the appliance to receive information from a portable data unit. Such faults may occur as a result of manufacturing or assembly errors, or may develop due to component deterioration or failure over time during operation.

It is generally desirable to minimize or eliminate the number of faulty components which are incorporated into a new appliance to assure reliable operation in the field. While techniques exist for testing each element of an optical transceiver, such techniques are generally labor intensive and require specialized equipment. Although extensive testing of this type does result in higher reliability and can eliminate faulty systems, the costs are significant and are often excessive. Further, once the components are installed it becomes difficult to access them for future testing, particularly where environmental sealants or "potting" are employed to protect the underlying electronic components. Finally, it is generally not possible or economical to repetitively test each of these elements once the device is in operation, to detect deterioration or failure in the field.

SUMMARY OF THE INVENTION

Accordingly, it is an object of the present invention to provide a method of testing accurate operation of both the transmitting and receiving elements of an optical transceiver automatically and inexpensively. It is a particular object to provide a self-test which may be executed by the circuitry itself, without requiring external equipment or operator interaction. A specific object is to provide such an automatic self-test which will determine that the bi-directional communication circuitry is operating properly, and to verify this fact or to indicate a failure mode, such as by generating an electrical output signal, by setting an appropriate flag or register for subsequent polling, or by otherwise providing an indication (e.g. aural or visual). A further object is to provide such a self-test which may be automatically performed periodically to verify continued integrity of the communication components.

These and other objects shall be apparent in light of the present specification.

In the inventive method and apparatus, the transceiver (including both transmitting and receiving elements) or appropriate circuitry associated with the transceiver, generates an input signal which has one or more known characteristics. The signal may be part of an actual communication, or may be a specially generated test signal. The characteristics may include, for example, pulse duration, signal frequency, specific transition times (such as ON transitions or OFF transitions), or the coded intelligence in a known message. Other characteristics of the optical pulse or pulse train may similarly be used, and more than one characteristic may be utilized in the following method.

The signal is then supplied to the transmitting electronics or circuitry of the transceiver. This circuitry is coupled to an appropriate optical emitter, and energizes the emitter to produce a transmitted optical signal corresponding to the input signal.

Vital to the present inventive method, at least a portion of the transmitted optical signal is then coupled to the optical detector which comprises part of the same transceiver. At least sufficient transmitted optical energy is thereby coupled to the detector to activate or stimulate the detector and cause the associated receiving circuitry of the transceiver to generate an output signal which may be used by other elements of the transceiver or the appliance in general.

The output signal will correspond to the received or detected optical signal, and therefore to the transmitted signal generated by the transceiver itself. Thus the output signal will have one or more characteristics corresponding to the known characteristics of the original input signal. Means are provided for testing the output signal with respect to one or more characteristics to determine whether the characteristics correspond to the input. For example, the emitter may be activated, and the detector thereafter monitored for a corresponding state change.

A successful polling of the received signal will occur only when all involved elements of the transceiver are functional. If any of the elements are faulty, the tested characteristic of the received signal will not match those of the original input.

By providing passive coupling such that a portion of the transmitted optical energy is permanently coupled to the detector, the inventive method may be performed without the need for any additional hardware or apparatus. In a preferred embodiment, a test routine may be provided as part of the operating code of an associated microprocessor. By appropriate instruction, the microprocessor may then execute the test procedure, causing the desired input to be applied to the transceiver and testing the resulting output signal for the desired characteristics. This test may be initiated, for example, by causing the microprocessor to assume a "test" mode, or may be initiated periodically by e.g. a clocked interrupt or other control generated by the microprocessor or applied externally. A fully automatic self-test is therefore provided.

It is desirable to provide an indication which may be read to determine the status of the transceiver. For example, an electrical output signal may be generated which is related to the outcome of the test comparison. Alternatively, a flag or register in electronic memory may be set to indicate the operational status of the transceiver, such as a fault flag which is set whenever one of the self-test procedures detects a failure. If a self-test is employed without operator intervention, the system may detect and report transitory failures otherwise difficult to detect. Alternatively, a visual or aural output may be generated, such as a blinking LED, to indicate an operative (or inoperative) state.

The self test may preferably be performed by the transceiver and associated electronics itself, separate from any host appliance. For example, the microprocessor, suitable programming code, and transceiver electronics may be mounted to a common circuit board with connectors for supplying necessary power and other inputs. By attaching the board to a test harness providing suitable power supply and control inputs, the test routine may be executed by the board itself to detect any assembly errors or faulty components before the control board is released for use in an appliance.

Various forms of optical communication may be tested by means of the present method. Although the preferred embodiment utilizes infrared communication signals generated by an infrared emitting diode (IRED) and an infrared sensitive photodiode detector, other optical wavelengths, emitters and detectors may be similarly utilized.

DETAILED DESCRIPTION OF THE PREFERRED EMBODIMENTS

Figure 1:
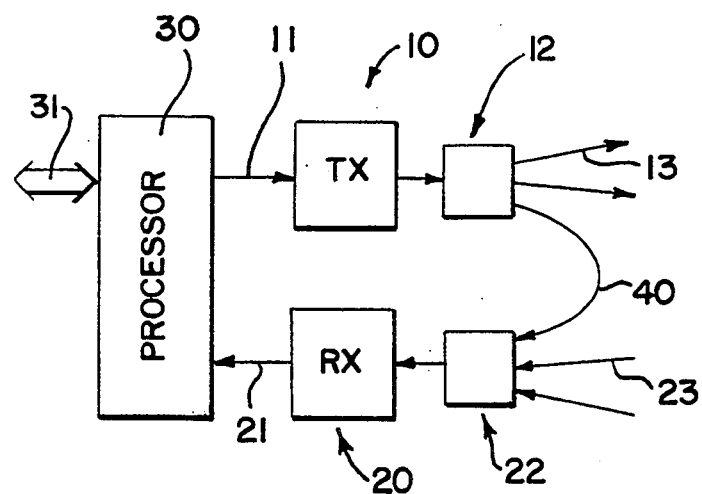
FIG. 1 is a diagrammatic representation of a preferred embodiment of the present invention.

The basic structure and operation of the present invention may be appreciated from FIG. 1. An optical transceiver is illustrated which includes transmitting circuitry or electronics 10 for stimulating an optical emitter 12 to generate a transmitted optical signal 13. The receiving portion of the transceiver includes an optical detector 22 coupled to receiving electronics or circuitry 20 for detecting and discriminating a received optical signal 23. The transmitting circuitry 10 may be provided with a control input 11, whereby the transmitting circuitry 10 and optical emitter 12 generate an output signal 13 corresponding to the control input 11. Suitable control inputs may be generated, for example, by processing circuitry 30, which may comprise in the preferred embodiment a microprocessor for controlling the optical communication link. The processor 30 may, in turn, be operatively linked 31 to a host device, which in the preferred embodiment may include a commercial laundry appliance. It should be understood, however, that the control signal 11 may be generated by other means, and may be generated by the transmitting electronics 10 itself.

As indicated diagrammatically by coupled energy 40, at least a portion of the transmitted signal 13 of emitter 12 is coupled to the optical detector 22, such that the detector 22 and receiving circuitry 20 will generate an output signal 21 corresponding to this coupled signal 40. Suitable coupling may be accomplished in various ways, as described more fully herein.

One or more characteristics of the received or output signal 21 may then be compared to the corresponding characteristics of the control input 11 to determine whether the transmitting and receiving elements are functioning as intended. In particular, one or more known characteristics of the output signal 21 may be tested by processor 30. If the transmitting electronics 10 and emitter 12 are functioning properly, the coupled energy 40 received by the detector 22 will correspond to the input signal 11. In turn, if the detector 22 and receiving circuitry 20 are functioning properly, the output signal 21 will correspond to the coupled signal 40, and therefore to input signal 11.

It should be understood that output signal 21 need not be identical to input signal 11 (which may be internal to the microprocessor). For example, receiving circuitry 20 may perform a decoding function, as described herein. However, the tested characteristics of the received signal will correspond to the input signal, such as the occurrence of the state transition as described below.

Figure 2:
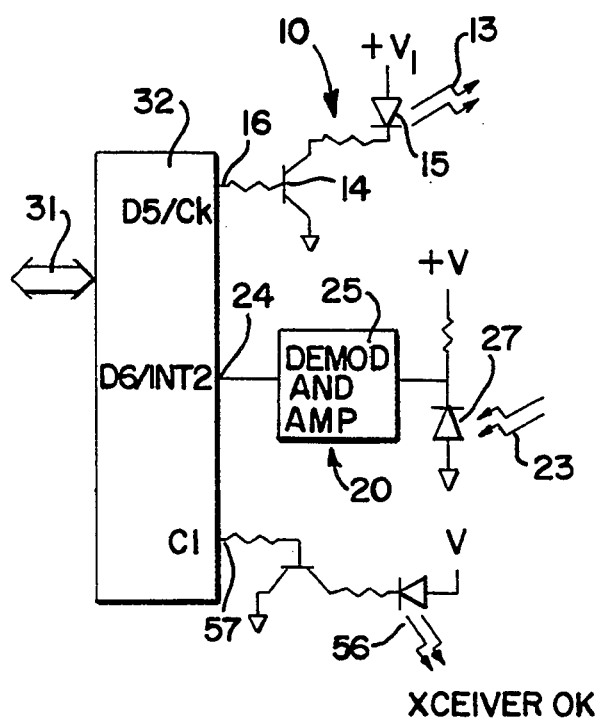
FIG. 2 is a circuit representation of the preferred embodiment shown in FIG. 1.

FIG. 2 illustrates preferred embodiments of circuitry which may be used in connection with the present method. In conjunction with commercial laundry appliances, a microprocessor controller 32 may be provided for controlling basic functions of the appliance, and for accumulating information on operation of the appliance (such as money received and various operational parameters). In the preferred embodiment, the microprocessor 32 may comprise a Hitachi microcomputer Part No. HD6305V0E09P having internal memory registers, various input/output ports 31 including interrupt inputs and controlled outputs.

One of the outputs 16 may be used, and controlled by appropriate programming in manners well known to those having ordinary skill in this art, to control an optical emitter as part of an optical transmitting circuit. In particular, transmitting electronics 10 comprising a switching transistor 14 may control an infrared emitting diode (IRED) 15 having an output 13 in the infrared frequency band. The control input of the switching transistor 14 may be connected to one of the controlled outputs 16 of the microprocessor 32. The output 16 may, in turn, be controlled by suitable programming of the microprocessor to generate coded outputs corresponding to, for example, data received by the microprocessor 32 from various machine monitoring inputs 31 and stored in the internal memory registers of the microprocessor 32 for subsequent transmission. To avoid interference by ambient infrared and optical signals which are typically present, it is desirable to encode the transmitted intelligence on a known carrier frequency. In the preferred embodiment, communications are provided at 1200 baud encoded (on/off keying) on a 30 KHz subcarrier. This encoding is accomplished by the microprocessor 32 in known manners, simplifying the transmitting circuitry 10. Thus, signal 16 may not be identical to the control signal 11, and control signal 11 may be internal to the microprocessor 32. Alternatively, encoding may be accomplished by the transmitting circuitry in manners known in the art, and other forms of encoding (or no encoding) may alternatively be employed if desired.

If encoding on a carrier frequency as preferred is employed, the receiving circuitry 20 may include a demodulator and buffer amplifier 25. In the preferred embodiment, a Motorola demodulator and preamplifier, Part No. MC3373P, is employed, and the discriminated output signal 24 is supplied to an input of the microprocessor 32. Thus, output signal 24 will not be identical to the coded output 16 in a preferred embodiment, although certain characteristics of the signals will correspond. Alternatively, the received signal may be directly supplied to the microprocessor, which itself may then decode and further discriminate the intelligence as desired in manners known in the art. In conjunction with the preferred IRED, a photodiode 27 sensitive to infrared received signals 23 is provided, and may preferably comprise a Lumex photodiode, Part No. OED-SP-5091.

The microprocessor may also control one or more output indicators. For example, output 57 may be used to control an optical LED with wavelengths in the visible spectrum. Other indicators, including audible indicators, may also be used in well known manners. The indicator 56 may be used by the microprocessor in conjunction with operation of a laundry device, such as to indicate machine status or, in a preferred embodiment, as an "add coins" indicator to signal the need for an operator to deposit additional coins to initiate a washing or drying cycle. In this instance, the indicator 56 may have a second function as described below of indicating the operational status of the transceiver.

Operation of the inventive method may be understood by specific preferred example. In conjunction with a control board for a laundry appliance, a microprocessor containing suitable firmware (control code) is mounted to a printed circuit board which also supports the transceiver elements previously described. An optical indicator or LED is also mounted to the control board, and the control board is provided with connectors for attaching it to a laundry appliance.

Figure 3:
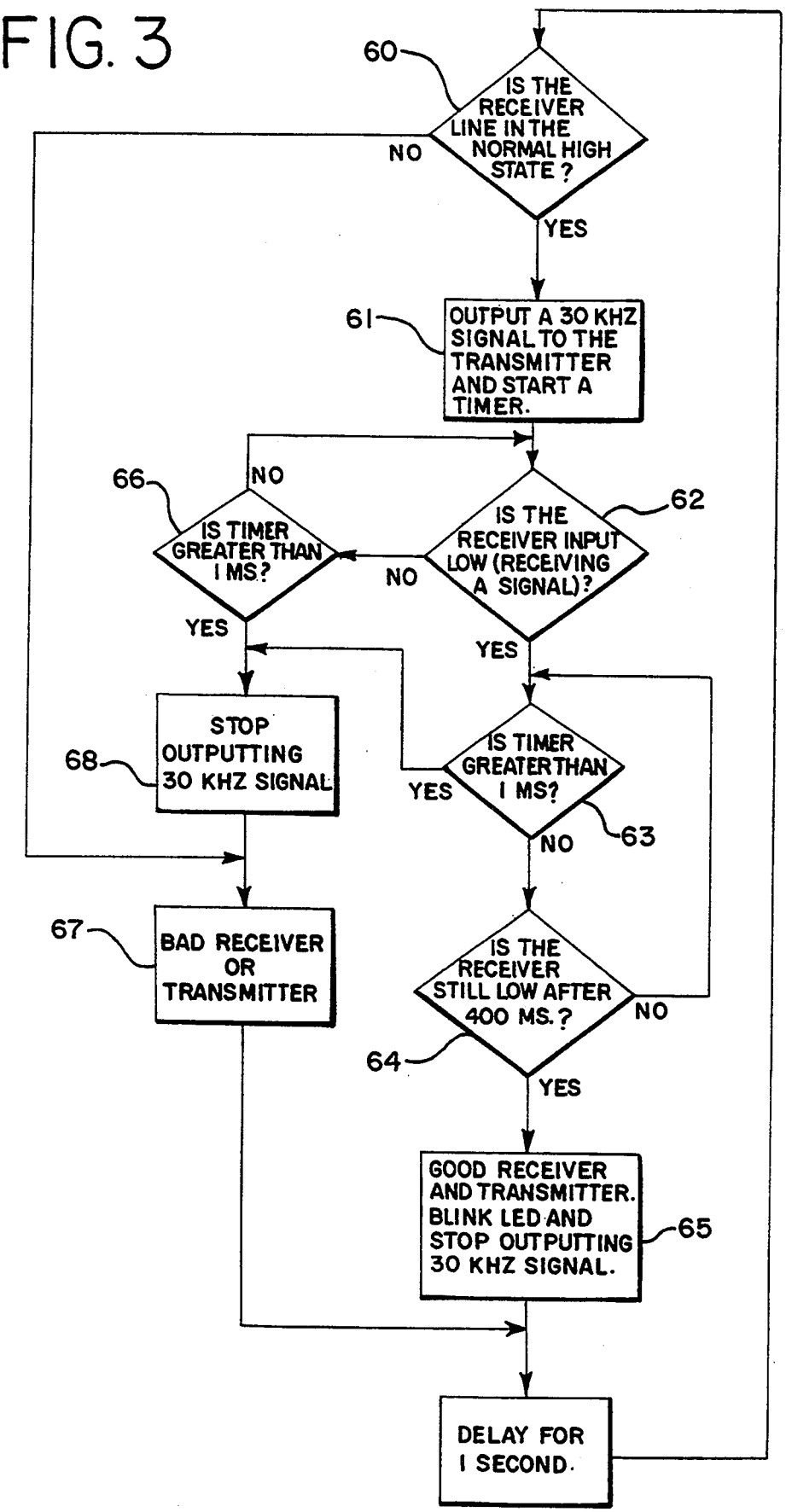
FIG. 3 is a flow chart of a preferred test mode routine.

To allow the control board to be tested for accurate operation of the transceiver components before (or after) the board is installed in an appliance, the control code includes a "test" mode routine which may be implemented by suitable activation of control inputs to the microprocessor in manners which are well known. FIG. 3 is a flow chart of the preferred test procedure, and suitable programming code for implementing the test procedure is set forth in the Appendix to this specification. It should be understood that the transceiver test routine described herein may be executed alone or as part of other tests or operational routines.

Referring to FIG. 3, when the "test" mode is implemented the microprocessor first tests 60 to determine whether the receiver is quiescent (that is, that no signal is presently being received). If the receiver line 24 is in its quiescent or normal (e.g. high) state, then the microprocessor generates a test signal output for driving the optical emitter 15, and initiates procedures for subsequently testing a received signal. In the preferred operation 61 the microprocessor generates an output signal comprising bursts of pulses (8) at the desired encoded frequency (30 kHz). This signal is supplied via output 16 to the transmitting electronics 10. An internal timer is simultaneously initiated within the microprocessor. This timer is subsequently used to ascertain whether a corresponding state transition (e.g. received signal) is received within an appropriate time window indicating accurate circuit operation. The window is selected to reject false received signals which are not indicative of accurate operation.

More particularly, the microprocessor polls the receiver input 24 to determine 62 whether a signal is now being received. If no signal is detected 66 for one millisecond, a fault is determined 67 and no "valid operation" signal is generated. After a short delay (one second), the test is repeated. This cycle is continued so long as the microprocessor remains in the "test" mode.

If a state transition does occur (e.g. the receiver input goes "low"), it must be determined whether it occurred within the valid time window. In particular, a received signal which has existed 64 for at least 400 microseconds prior to expiration 63 of one millisecond (i.e. which occurs no later than 600 microseconds after the transmitted signal is generated and is present for at least 400 microseconds) generally indicates valid circuit operation. To facilitate implementation, the microprocessor checks for a state transition until one is detected. The processor then checks again after 400 microseconds to determine whether the signal is still present. If so, and if the one millisecond window has not expired, then a "valid operation" indication is generated 65 by outputting a control signal 57 to briefly illuminate a visible spectrum LED, and the test signal is suspended. The test is then repeated after a short delay (one second).

If, however, no signal is received 62 after an appropriate delay 63, 66, then the test has been failed 67 and the microprocessor ceases outputting the test signal 68. Accurate operation therefore results in the LED indicator blinking repeatedly at one second intervals, while a fault in any portion of the transceiver results in no, or in erratic, blinking.

It is thus seen that the preferred test procedure includes polling the received signal 24 for appearance of a state transition, corresponding to initiation of a test signal, within an appropriate window indicative of accurate operation. In this test, a first input signal is generated by the microprocessor which has the known characteristic of a state transition occurring at a known relative time (as determined by an initiated internal timer). This signal is applied to transmitting circuitry and produces a transmitted optical signal, a portion of which is coupled to an optical detector. The coupled signal causes the optical detector to generate an output signal, which is supplied to the microprocessor and corresponds to the transmitted optical signal. The microprocessor, in conjunction with suitable programming, compares this known characteristic (time of occurrence of state transition) to the corresponding characteristic of the first output signal (known time of first output signal state transition) and determines whether the associated circuit elements are operating within desired parameters.

In another embodiment, the processor 30 may generate a control signal 11 having predetermined and known duration. The output signal 21 will, in normal operation, comprise a pulse having substantially identical duration. The processor 30 may be configured in manners well known in the art to determine the duration of signal 21 and compare it to the known duration of the previously generated control signal 11. Processor 30 may then branch to appropriate responsive actions, at the choice of the designer, depending on the outcome of this comparison. For example, the processor 30 may generate a control signal as part of output 31 indicating that the test has been successfully passed or has been failed, or may set a flag or electronic register to indicate the results of the comparison.

Numerous other signal characteristics may similarly be used for test or comparison in connection with the present method. For example, input 11 may comprise a signal of known frequency, wherein the frequency of received signal 21 is determined and compared. In another embodiment, the time of occurrence of a sequence of multiple state transitions may be monitored, such as a sequence of ON/OFF transitions at known times.

The optical transceiver illustrated is intended in general for communicating data and instructions on behalf of the host appliance. In a further embodiment, therefore, a comparison may be made between the encoded intelligence of a particular input 11 and the corresponding received intelligence of an output 21. In this regard the processor 30, for example, may generate a known test sequence (e.g. word(s)) as a test signal 11. Alternatively, the processor may utilize operational signals for the test function. In this embodiment, data for communication may be supplied to the processor via inputs 31 and appropriately encoded for transmission by emitter 12. By providing a coupling of energy 40, a portion of all such transmitted signals 13 will be coupled to optical detector 22 and will, therefore, be received as outputs 21 during normal operation. The processor 30 may be programmed to compare all or part of the received intelligence (e.g. decoded word(s)) embodied in signals 21 during a transmission of coded intelligence to verify accuracy of each transmission, or to periodically compare accuracy of selected portions of the transmission as desired. It will be understood, of course, that these examples are merely illustrative and are not intended to be exhaustive.

Figure 4:
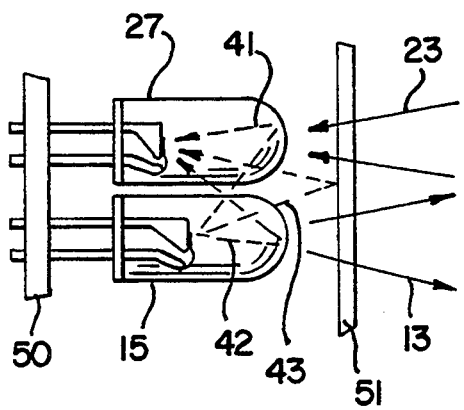
FIG. 4 is a side view of a preferred physical orientation of the emitter and detector elements.

FIG. 4 illustrates a preferred physical arrangement of the emitter 15 and detector 27 for providing desired transceiver operation and necessary coupling 40. In particular, the preferred IRED and photodiode are packaged in standard cylindrical lenses which are transparent to at least the intended infrared wavelengths. These elements are mounted in close proximity as illustrated on circuit board 50 which, in the preferred embodiment, further supports the microprocessor 32 and other elements of the control module for the host appliance. It has been found that the preferred components identified, which include hemispherical lenses as shown, provide beam patterns that may result in adequate reflective and refractive coupling 41, 42 for sufficient transmitted energy to be coupled to the detector, without need for any external reflectors or devices. However, in the preferred embodiment a protective window 51 is provided in front of the emitter and detector. Although the window 51 is selected to be substantially transparent to the infrared or optical frequencies used (such as ruby Lexan), surface reflections will provide additional coupling 43 to assure that sufficient energy is coupled for detection.

Figure 5:
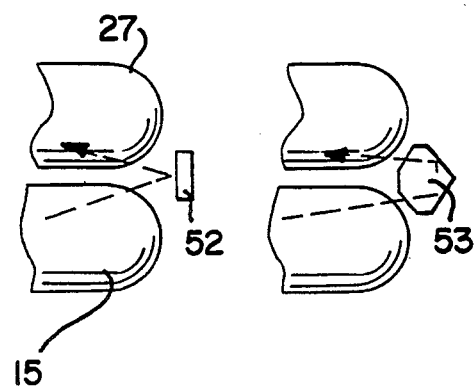
FIG. 5 illustrates representative alternative means for coupling emitted energy to the receiving element.

FIG. 5 illustrates alternative embodiments for providing optional external coupling. For example, a reflector 52 may be provided to intercept at least a portion of the transmitted energy and reflect it to the detector 27. Corner prisms 53 or other guides (such as fiber optic guides) may similarly be employed. It is preferable that reflectors or optical guides intercept only a portion of the transmitted energy, and shadow only a portion of the detector 27, so that normal communication with an external device may be accomplished.

Figure 6:
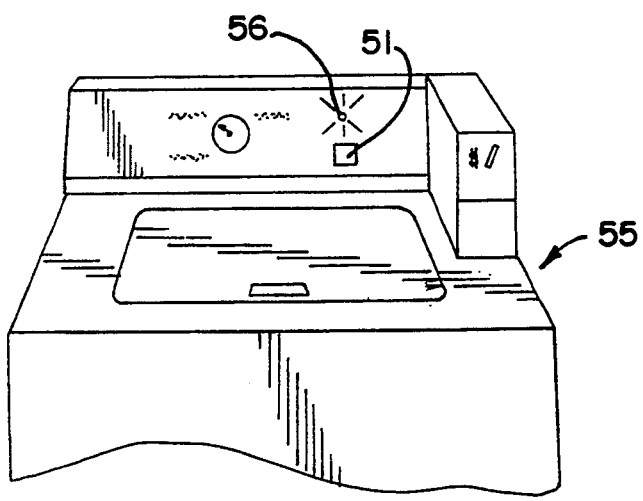
FIG. 6 illustrates an embodiment of the present invention in conjunction with a commercial laundry appliance.

Although the present invention is useable in connection with numerous optical communication schemes and devices, in a preferred embodiment it is used in connection with commercial laundry appliance having data accumulation and communication capability. As shown in FIG. 6, for example, the laundry appliance 55 may be provided with a window 51 on its control panel for coupling the transceiver elements to an external cooperating device. The microprocessor 32 may provide control functions for the appliance 55, in addition to supporting the self-test features of the present invention. The microprocessor may be provided with appropriate control code to allow the device to be placed in a "test" mode for generating a known test signal of, for example, known duration, and for testing the corresponding received signal.

In conjunction with operation of the appliance, one or more indicators 56 may be provided. By suitable programming, such indicators 56 may be utilized as previously described to indicate the results of the test procedure. If, alternatively, the appliance is provided with programming for periodically conducting a self-test according to certain aspects of the present invention, the results of the test may be stored in registers of the microprocessor, and may be communicated by coded manipulation of the indicator 56. In this manner, the route or service person who is responsible for maintaining the appliance 55 will know that a fault has occurred and that data communication may not be possible.

While this invention has been shown and described in conjunction with preferred embodiments, it is apparent that certain changes and modifications, in addition to those mentioned above, may be made from the basic features of the present invention. Accordingly, it is the intention of applicants to protect all variations and modifications within the true spirit and valid scope of the present invention.

Appendix

```
COMCHK   .EQU    $3        SET IN CONTINOUS CYCLE ROUTINE WHEN IT
*                          IS OKAY FOR CLOCK AND COMM TESTS TO
*                          BEGIN, CLEARED ON EXIT FROM CONTCY TO
*                          INDICATE TESTS SHOULD END (FLAG2)
COMCH1   EQU     $2        SET BY TIMER INT TO TELL COMMINT THAT
*                          THE NEXT TIMER INT IS FOR COMCHK (FLAG2)

****************************************************************
*TIMER INTERRUPT ROUTINE                                        *
*CALLS: CLOCK,COINR,DOOR,PWRDWN,LEDDRV,GETBIT,COMMINT,          *
*       INPUTS,DIPSW,OPTO,SFTCHK,PRCTYP                         *
*CALLED BY: GENERATED BY MS INTERRUPTS                          *
****************************************************************
TIMINT   BCLR    7,TCR     CLEAR INTERRUPT PENDING BIT
         BRCLR   COMM,FLAG1,SKTIM1 IS COMM FLAG CLR?N,GETBIT
         JMP     GETBIT    JUMP TO GETBIT
SKTIM1   BRCLR   7,MISC,SKTIM2 IF BIT7 OF MISC IS SET JUMP
*                          TO COMMINT
         BRSET   MASK,MISC,SKTIM2 IF COMM INT NOT WANTED
*                          THEN KEEP GOING
         JMP     COMMINT   JUMP TO COMMINT

******************MORE INTERUPT CODE************************
CLOCK    BRCLR   COMCH1,FLAG2,SKCLK1 IS SERIAL PORT RUNNING?
         JSR     STOPCLK   STOP THE SERIAL PORT CLOCK
         BCLR    COMCH1,FLAG2 CLEAR FOR NEXT TIME
SKCLK1   DEC     WAITTI

SKSEC7   BRCLR   COMCHK,FLAG2,ESECCL IN CONTINUOUS CYCLE?
         BRCLR   INT2,PORTD,ESECCL Y,TEST IRED RECEIVER
         JSR     STRTCLK   VOLTAGE HIGH, SO ENABLE SCI INTS
         BSET    COMCH1,FLAG2 TELL COMMINT THAT IT IS CHECKING COMM
ESECCL   JMP     RSECCL
***********************END OF SECCLK***********************

********************MAIN ROUTINE***************************
CONTCY   LDA     PORTA     IS PORTA LOW?
         BNE     SKCONT2   FOR PORTA TO BE LOW DIPSWITCHES
SKCONT2  BSET    COMCHK,FLAG2 INDICATE IT IS OKAY TO START COMM TESTS
         BCLR    MORCON,FLAG0 TURN THE LED OFF
         BSET    CYCLE,STATS1 INDICATE IN A CYCLE
         BRSET   DRYER,FLAG1,LPCONT3 IS MACHINE A DRYER?Y,LPCONT3
LPCONT1  BCLR    TIMER,FLAG2 TURN THE RELAY OFF
         BRCLR   CYCDON,FLAG3,LPCONT1 IS IT IN END OF CYCLE?N,LPCONT1
         BRCLR   CC,FLAG1,ECONTCY Y,IS IT STILL IN CC MODE?N,ECONTCY
         CLR     MOTTI1    CAUSE DELAY BEFORE RELAY IS TURNED ON
LPCONT2  BRCLR   LID,STATS1,SKCON2.5 IS THE WASHER LID OPEN?N,SKCON2.5
         BCLR    TIMER,FLAG2 TURN THE RELAY OFF
         BRA     SKCON2.7 BRANCH TO SKCON2.7
SKCON2.5 BSET    TIMER,FLAG2 TRY TO TURN RELAY ON
SKCON2.7 BRSET   CYCDON,FLAG3,LPCONT2 IS IT IN END OF CYCLE?Y,LPCONT2
```

```
            BRA     LPCONT1
LPCONT3     BCLR    C0,PORTC    TURN THE RELAY OFF
LPCONT4     BRCLR   CC,FLAG1,ECONTCY IS THE CC FLAG STILL SET?N,ECONTCY
            BRSET   LID,STATS1,LPCONT3 IS THE DOOR OPEN?Y,LPCONT3
            BSET    C0,PORTC    TURN THE RELAY ON
            BRA     LPCONT4
ECONTCY     BCLR    COMCHK,FLAG2 INDICATE COMM TESTS SHOULD END
            CLR     COINC       CLEAR THE COIN ESCROW
            BCLR    LIDTOG,FLAG3 FORCE A LID OPENING PRIOR TO CYCLE
            BRSET   DRYER,FLAG1,SKCONT3 IS MACHINE A DRYER?Y,SKCONT3
            BCLR    CYCLE,STATS1 INDICATE NOT IN A CYCLE
            JMP     RCONTCY     RETURN TO MAIN
SKCONT3     JMP     CLDWN       JUMP TO THE CLDWN ROUTINE
***********************END OF CONTCY************************

****************************************************************
*SERIAL COMMUNICATIONS INTERRUPT SERVICE ROUTINE              *
*COMMENT: THIS ROUTINE STARTS THE CLOCK OSCILLATING           *
*         AGAIN WHENEVER IT GETS DONE FROM THE LAST TIME.     *
*         IT IS SET UP TO OSCILLATE AT 31.25 KHZ.             *
*         IT IS USED TO SEND START BITS AND 0 BITS.           *
****************************************************************
SCI         STA     SCIDAT      serial interrupt routine
            RTI
********************END OF SCI********************************

****************************************************************
*COMMUNICATIONS INTERRUPT2 SERVICE ROUTINE                    *
*CALLED BY: TIMINT                                            *
*COMMENTS: THIS ROUTINE IS EXECUTED WHEN THE START BIT OF     *
*          EVERY BYTE IS RECEIVED. IT SETS UP THE TIMER       *
*          FOR 1/2 BIT TO MAKE SURE IT IS A START BIT AND     *
*          SETS UP OTHER PERTINENT DATA                       *
*          THE TX FLAG MEANS THAT BYTES ARE BEING             *
*          TRANSMITTED. MESS TELLS US WHAT MESSAGE HANDLER    *
*          WE ARE CURRENTLY ON. IF IT IS SET TO 0, COMMINT    *
*          WILL START OVER, LOOKING FOR THE FIRST MESSAGE.    *
*          THE COMM FLAG LETS THE TIMER INTERRUPT KNOW THAT   *
*          COMMUNICATIONS IS USING THE TIMER.                 *
****************************************************************
COMMINT     LDA     #40
            STA     TDR         set timer for < 1/2 bit
            LDA     MESS        get message number
            BNE     COMM1       first message?
            INC     MESS        yes, point at next handler
            CLR     NACKCO      clear so NACK COUNT can use
            JSR     STDHED      set up for first header
            LDA     #170
            STA     WAITTI      170 ms to get START message
            LDA     #10         8 bits + start & stop
            STA     BIT
COMM1       BSET    COMM,FLAG1  signal communications
            BCLR    TX,FLAG1    we are receiving
            BSET    MASK,MISC   disable int2
```

```
            BCLR    7,TCR       clear pending timer ints
            RTI
******************END OF COMMINT*************************
```

```
***********************************************************
*COMMUNICATIONS TIMER INTERRUPT SERVICE ROUTINE
*CALLS: COINR, PWRCHK
*CALLED BY: TIMINT
*COMMENTS: THIS ROUTINE GETS CALLED BYT THE TIMER INTERRUPT*
*          ROUTINE IF THE COMM FLAG IS SET.  IT SENDS AND  *
*          RECEIVES EACH DATA BIT AND START AND STOP BITS. *
*          IT CALLS THE CRC, COIN DROP, AND POWER DOWN     *
*          ROUTINES.  IT SETS UP THE TIMER FOR THE NEXT BIT*
*          OR JUMPS TO THE APPROPRIATE MESSAGE HANDLER.    *
*          A LOW INT2 PIN SIGNALS THE RECEIPT OF OPTICAL   *
*          ENERGY (START BIT OR 0 BIT).                    *
*          BIT = 9 : START BIT                             *
*          BIT = 1 TO 8 : DATA BITS                        *
*          BIT = 0 : STOP BIT                              *
*          BUFLEN : LENGTH OF BUFFER LEFT TO DO            *
*          RECPTR : CURRENT BYTE TO SEND OR RECEIVE        *
*          THE BYTE TO SEND IS ACTUALLY COPIED TO CRC3     *
*          FIRST SO THAT IT CAN BE ROTATED                 *
***********************************************************
GETBIT   LDA    #104      set timer int. values
         ADD    TDR       for 833 us
         STA    TDR
         LDX    RECPTR    point at buffer
         DEC    BIT       look at next bit
         LDA    BIT
         BRSET  TX,FLAG1,TRANS  transmitting?
***********************************************************
*RECEIVING                           DAO                   *
*COMMENTS: IF A BIT IS TO BE RECEIVED THIS ROUTINE         *
*          GETS EXECUTED.                                  *
***********************************************************
GETBI1   BEQ    BYTEDN    no, done with 8 bits?
         CMP    #09       no
         BEQ    ABORT2    startbit? yes, check startbit
ABORT2   BRCLR  COMCH1,FLAG2,ABORT3 IN CONTINUOUS CYCLE?
         BSR    STOPCLK   Y, END TEST. DISABLE SCI INTS.
         BCLR   COMCH1,FLAG2 DONE WITH COMM CHECK
         BRSET  INT2,PORTD,ABORT1 DOES RECEIVER WORK?
         LDA    #$05      Y, BLINK MORE COINS LIGHT
         STA    LEDTMR    LENGTH OF TIME
         CLR    BLINKR    NO BLINK
         BSET   LED,FLAG2 MAKE SURE IT STARTS ON
         BSET   C1,PORTC  MANUALLY TURN IT ON
                          IT IS RESET IN TIMER INT EVERY MS
         LDA    #25
         STA    TDR
         BRA    ABORT1
ABORT3   BRCLR  INT2,PORTD,EXIT if bad startbit abort
         BRA    WAITR1    make comm wait for 170 ms
MESS12
*    THE ACK HAS BEEN SENT, SO TERMINATE COMMUNICATIONS
ABORT1   CLR    MESS      start over
*  THIS ROUTINE SETS EVERYTHING UP TO WAIT FOR THE NEXT START BIT
```

```
WAITRE   BCLR   MASK,MISC    enable comm interrupts
WAITR1   BCLR   COMM,FLAG1   tell timer interrupt we are't ready
WAITR2   BCLR   REQUES,MISC  clear pending comm interrupts
         RTI
********SUBROUTINE TO START THE SERIAL PORT CLOCK**********
STRTCLK  BCLR   5,SCISTS     enable sci interrupts
         BSET   5,SCICTL     enable clock
         STA    SCIDAT       start serial clock
         RTS
*****************************************************************
**********SUBROUTINE TO STOP THE SERIAL PORT CLOCK**********
STOPCLK  LDA    #$05         SCI CONTROL REG CLK 30K HZ
         STA    SCICTL       AND DISABLE SCI CLOCK
         LDA    #$30         SCI INTERRUPT AND TIMER2
         STA    SCISTS       ABD DISABLE SCI INTERRUPTS
         RTS
```

What is claimed is:

1. An apparatus having a communication system which allows the apparatus to communicate with a portable data probe, the communication system comprising:
   a programmable controller;
   an optical emitter coupled to the programmable controller; and
   an optical detector coupled to the programmable controller,
   the programmable controller capable of running a communication mode routine for controlling the optical emitter and detector to communicate with the data probe wherein the detector detects an interrogation signal emitted by the data probe and the emitter transmits an answer signal in response to the interrogation signal received by the detector from the portable probe, the communication mode routine that the controller is capable of running is further characterized as a routine that includes a test mode subroutine capable of controlling the optical emitter end detector to communicate with one another wherein the emitter transmits a test signal having one or more known characteristics and the detector detects at least a portion of the test signal transmitted by the emitter and the test signal transmitted by the optical emitter is compared with the test signal detected by the optical detector.

2. An apparatus according to claim 1 wherein at least one known characteristic of the test signal transmitted by the emitter includes signal state transitions, and the comparison of the test signal transmitted by the emitter with the test signal detected by the detector includes comparing the time of occurrence of a state transition in the test signal detected by the detector with the known time of occurrence of the corresponding state transition in the test signal transmitted by the emitter.

3. An apparatus according to claim 1 wherein at least one known characteristic of the test signal transmitted by the emitter includes a predetermined signal frequency, and the comparison of the test signal transmitted by the emitter with the test signal detected by the detector includes comparing the frequency of the test signal detected by the detector with the predetermined signal frequency of the test signal transmitted by the emitter.

4. An apparatus according to claim 1 wherein at least one known characteristic of the test signal transmitted by the emitter includes pulse durations and the comparison of the test signal transmitted by the emitter with the test signal detected by the detector includes comparing the duration of a pulse in the test signal detected by the detector with the duration of the corresponding pulse in the test signal transmitted by the emitter.

5. An apparatus according to claim 1 wherein at least one known characteristic of the test signal transmitted by the emitter includes a coded pulse sequence and the comparison of the test signal transmitted by the emitter with the test signal sequence of the test signal detected by the detector pulse sequence of the test signal detected by the detector with the coded pulse sequence of the test signal transmitted by the emitter.

6. An apparatus according to claim 1 wherein the optical emitter and the optical detector are positioned adjacent to one another to allow test signals transmitted by the emitter to be detected by the detector.

7. An apparatus according to claim 1 further including a reflector partially positioned in front of the emitter and detector for directing test signals transmitted by the emitter to the detector.

8. An apparatus according to claim 1 wherein the interrogation signals, answer signals and test signals comprise infrared signals.

9. An apparatus according to claim 1 wherein the optical emitter is a photo emitting solid state diode.

10. An apparatus according to claim 1 further comprising means for generating an output indicative of the result of the comparison.

11. A method for detecting faults in an optical transceiver, the optical transceiver including a programmable controller, an optical emitter coupled to the programmable controller and an optical detector coupled to the programmable controller, the programmable controller capable of running a communication mode routine for controlling the optical emitter and detector to communicate with the data probe wherein the detector detects an interrogation signal emitted by the data probe and the emitter transmits an answer signal in response to the interrogation signal received by the detector from the portable probe, the communication mode routine that the controller is capable of running is further characterized as a routine that includes a test mode subroutine comprising the steps of:
   detecting the absence of an interrogation signal at the optical detector;
   generating a test signal having one or more known characteristics;
   transmitting the test signal from the optical emitter;
   detecting the transmitted test signal by the optical detector;

comparing the test signal detected by the optical detector with the test signal transmitted by the optical emitter.

12. A method according to claim 11 wherein the characteristics include signal state transitions, and wherein the step of comparing includes the step of comparing the time of occurrence of a state transition in the detected test signal with the known time of occurrence of the corresponding state transition in the transmitted test signal.

13. A method according to claim 12 wherein the step of comparing the time of occurrence comprises the steps of initiating a time upon the occurrence of the state transition of the transmitted test signal and subsequently polling the timer upon the occurrence of the state transition in the detected test signal.

14. A method according to claim 12 wherein the step of comparing the time of occurrence comprises the steps of testing for a state transition in the detected test signal corresponding to the state transition of the transmitted test signal and determining whether the time of occurrence of the state transition in the detected test signal occurs within a predetermined time window after the occurrence of the state transition in the transmitted test signal.

15. A method according to claim 11 wherein the characteristic includes signal frequency and the step of comprising includes the step of comparing the frequency of the detected test signal with the frequency of the transmitted test signal.

16. A method according to claim 11 wherein the characteristic includes pulse duration and the step of comparing includes the step of comparing the pulse duration of the detected test signal with the pulse duration of the transmitted test signal.

17. A method according to claim 11 wherein the characteristic includes a coded pulse sequence and the step of comparing includes the step of comparing the coded pulse sequence of the detected test signal with the coded pulse sequence of the transmitted test signal.

18. A method according to claim 18 wherein the test signal comprise an infrared signal.

19. A method according to claim 11 wherein the optical emitter is a photon emitting solid state diode.

20. A method according to claim 11 further including the step of generating an output signal indicative of the result of the comparison.

* * * * *

UNITED STATES PATENT AND TRADEMARK OFFICE
CERTIFICATE OF CORRECTION

PATENT NO. : 5,345,230
DATED : September 6, 1994
INVENTOR(S) : Charles L. Jackson et al.

It is certified that error appears in the above-indentified patent and that said Letters Patent is hereby corrected as shown below:

Column 16,

Claim 5, line 5, delete "sequence of the test signal".

Claim 5, line 6, after "detector" insert --includes comparing the coded--.

Claim 9, line 2, delete "photo" and substitute --photon--.
Col. 18, claim 15, line 3, delete "comprising" and substitute --comparing--.

Col. 18, line 1, delete "18" and substitute --11--.

Signed and Sealed this

Twenty-ninth Day of August, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,345,230
DATED : September 6, 1994
INVENTOR(S) : Charles L. Jackson, et. al.

It is certified that error appears in the above-indentified patent and that said Letters Patent is hereby corrected as shown below:

Title page, item [73], Assignee: should read--Maytag Corporation, Newton, Iowa--.

Signed and Sealed this

Twenty-fourth Day of October, 1995

Attest:

BRUCE LEHMAN

Attesting Officer

Commissioner of Patents and Trademarks